(12) United States Patent
Shook et al.

(10) Patent No.: US 8,328,466 B1
(45) Date of Patent: Dec. 11, 2012

(54) BUOYANCY STABILIZED UNDERWATER PLOW AND METHODS FOR USE

(75) Inventors: Brian Shook, San Diego, CA (US);
Steve Whiteside, San Diego, CA (US);
Robert Lee, Descanso, CA (US);
Ronald Skala, Murrieta, CA (US); Paul Wade, Chula Vista, CA (US); Bret Thomson, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 288 days.

(21) Appl. No.: 12/880,200

(22) Filed: Sep. 13, 2010

(51) Int. Cl.
*F16L 1/16* (2006.01)
(52) U.S. Cl. ...................................................... 405/159
(58) Field of Classification Search .......... 405/159–162, 405/164, 165, 180–183
See application file for complete search history.

(56) References Cited

U.S. PATENT DOCUMENTS

| | | | |
|---|---|---|---|
| 3,898,852 A | 8/1975 | Ezoe et al. | |
| 4,069,679 A | 1/1978 | Manley, Jr. | |
| 4,892,443 A | 1/1990 | Kunze et al. | |
| 6,036,403 A * | 3/2000 | Hitzke | 405/164 |
| 2010/0008730 A1 * | 1/2010 | Valdy | 405/169 |

FOREIGN PATENT DOCUMENTS

FR 2903541 A1 * 1/2008

OTHER PUBLICATIONS

Unpublished U.S. Appl. No. 12/876,323, entitled "Autonomous Underwater Plow", by Steve Whiteside et al., filed Sep. 7, 2010, USA, All.
Unpublished U.S. Appl. No. 12/876,407, entitled "Underwater Plow Having an Improved Blade Assembly", by Steve Whiteside et al., filed Sep. 7, 2010, USA, All.

* cited by examiner

*Primary Examiner* — David Bagnell
*Assistant Examiner* — Kyle Armstrong
(74) *Attorney, Agent, or Firm* — Arthur K. Samora; Kyle Eppele (57) ABSTRACT

An underwater plow can include a depressor cam and a chute cam that are pivotably attached to a blade portion. The blade portion can be formed with a trough and the depressor cam can be biased in the trough. The chute cam can be formed with a groove having a minimum thickness at its attached end and an increasing taper to a maximum thickness at its distal end. A sensor passing through the plow contacts the edge of the depressor cam, causing depressor cam rotation away from the trough. The sensor passes the depressor cam and pushes against the chute cam, which causes the chute cam to contra-rotate relative to the depressor cam until the sensor passes through the chute arm at is maximum thickness. Once the sensor passes through, the cams contra-rotate back to their respective biased positions.

13 Claims, 10 Drawing Sheets

BUOYANCY STABILIZED UNDERWATER PLOW AND METHODS FOR USE

FEDERALLY-SPONSORED RESEARCH AND DEVELOPMENT

This invention (Navy Case No. 100391) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to plows. More particularly, the present invention pertains to an autonomous underwater plow, which has a plow assembly that facilitates underwater deployment of sensor arrays on the ocean floor, without requiring the assistance of a support ship.

BACKGROUND OF THE INVENTION

Sometimes it is necessary to deploy a sensor cable array on the ocean floor, for any one of a number of reasons. In the past, sensor arrays have been primarily deployed by laying the array on the surface of the sea floor. This has usually been accomplished by paying the sensor cable array off the stern of a surface ship.

Surface deployments (deploying the cable on the ocean floor surface) are simpler to execute than buried deployments, but these deployments leave the sensors and connection cables extremely susceptible to damage from marine life. The cable array can also be vulnerable to fishing operations such as trawling, and boating operations where the vessel equipment is passed across the ocean floor. It may be advantageous to bury the array to minimize these risks. When underwater cables are buried, the operation typically requires the use of a large plow pulled by a surface craft. This type of operation is effective, but not covert. In some cases it may be desirable to covertly and autonomously bury a sensor array.

In view of the above, it is an object of the present invention to provide an autonomous underwater plow that has its own propulsion source. It is another object of the present invention to provide an autonomous underwater plow that can deploy a cable without requiring the assistance of an operator or a support ship. Yet another object of the present invention to provide an autonomous underwater plow that can overcome obstacles on the ocean floor as it deploys a cable payload. Still another object of the present invention to provide an autonomous underwater plow that is easy to assemble in a cost-effective manner. An object of the present invention is to provide an autonomous underwater plow that can deploy a cable payload in the ocean floor by burying the cable but leaving the sensors on the surface of the ocean floor. Another object of the present invention to provide an autonomous underwater plow that can covertly deploy a cable payload without being observed from the water surface.

SUMMARY OF THE INVENTION

A buoyancy-stabilized underwater plow and methods for use therefor according to several embodiments can include a plow assembly with a blade portion, a depressor cam and a chute cam. The depressor cam can be pivotably attached to one end of the blade portion and biased to selectively rotate in a first direction, and, the chute cam pivotably attached to the other end the blade portion and biased to rotate in a second direction that is opposite to the direction of rotation of the depressor cam. The blade portion can further be formed with a trough, and the depressor cam can also be biased so that it is in contact with the trough when at rest.

The chute cam can be biased so that it is at an angle $\alpha$ from a longitudinal axis defined by the plow assembly when the chute cam is at rest. The chute cam can have a proximate end and a distal end, and the proximal end of the chute cam can be pivotably attached to the distal end of the blade portion. The chute cam can have an arm that is formed with a slot to let a cable-and-sensor array pass through the plow assembly. The arm can be formed with a slot that can have a minimum thickness proximate the attachment point of the chute cam to the blade, which is sufficient to allow said cable to pass therethrough, but not the array sensor. The arm slot can have an increasing taper to a maximum thickness at its distal end, which is sufficient to allow the sensor to pass therethrough. The chute cam according to several embodiments can be is formed with a stop, while the depressor cam can be formed with a pin.

As the array cable passes through the plow assembly, it does so in the trough. As a sensor from array passes through the plow assembly, it cannot pass through the trough. Instead, it is urged along the edge of the depressor cam, which causes the depressor cam to rotate out of the blade trough to allow the sensor to pass. The sensor passes through until it contacts the chute cam groove. Because the sensor cannot pass through the narrow portion of the groove, it pushes against the chute cam, which causes the chute cam to contra-rotate relative to the depressor cam until the sensor reaches the portion of the groove having sufficient thickness to allow the sensor to pass through the cam chute. When this occurs, the pin contacts the stop to prevent excessive contra-rotation of the chute cam and depressor cam. Once the sensor has passed through the groove in the chute cam, the chute cam and depressor cam contra-rotate back to their respective biased positions.

The plow can further include a semi-cylindrical frame having a plow end and a float end. The plow assembly can be attached to the plow end so that the frame is coincident with a longitudinal axis defined by the plow assembly, and so that it surrounds a fairlead that is connected to the plow assembly. A float can be pivotably attached to the frame float end. The plow has an overall weight W, and the float can establish a buoyancy force $F_B$ that is less than said weight W, but that is sufficient to lift said float end when said plow assembly contacts the ocean floor to establish a rake angle $\beta$ between said frame and the ocean floor. With this configuration, less power is required to move the plow along the ocean to deploy the payload, because a portion of the plow is suspended in the water.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which:

FIG. 7 is a cross-sectional view of the plow assembly of FIG. 6 taken along line 12-12 in FIG. 10, which shows the manner in which the payload is passes through the plow assembly during deployment.

DETAILED DESCRIPTION OF THE EMBODIMENTS

Referring now to the Figures, an autonomous underwater plow according to several embodiments of the present invention can be shown and generally designated by reference character 10. As shown, plow 10 can include a frame 12 having a plow end 14 and a float end 16. A plow assembly 18 can be fixed to the plow end 14, and a propulsion assembly 20 can be pivotably attached to the float end 16 of frame 12, as shown in FIGS. 1-4. Frame 12 can be formed with a semi-cylindrical configuration (although other geometric configurations could be used), which defines a storage space, and a spool 28 can be fixed to frame 12 (See FIG. 1) in the storage space for carrying a sensor-and-cable payload 30. A computer control means (CCM) 32 can also be fixed to frame 12. CCM 32 can be in communication with spool 28, with float 26 and with thrusters 22a, 22b to steer plow 10 and maintain buoyancy of plow 10 as payload 30 is deployed, in manner more fully described below.

Propulsion assembly 20 can further include a pair of thrusters 22a, 22b, that are mounted to a thruster support bar 24 with brackets 25. CCM 32 can also be in communication with thrusters 22 to thereby operate the thrusters to steer plow 10 along a predetermined course. A float 26 can further be attached to thruster support bar 24 to establish a propulsion assembly structure wherein float 26 is rigidly coupled relative to thrusters 22a, 22b. As mentioned above, the propulsion assembly is pivotably attached to frame 12. With this configuration, the propulsion assembly 20 provides a propulsion force $F_P$ that is perpendicular to the buoyancy force $F_B$ provided by float 26 when plow 10 is fully deployed, as shown in FIG. 4.

Figure 2:
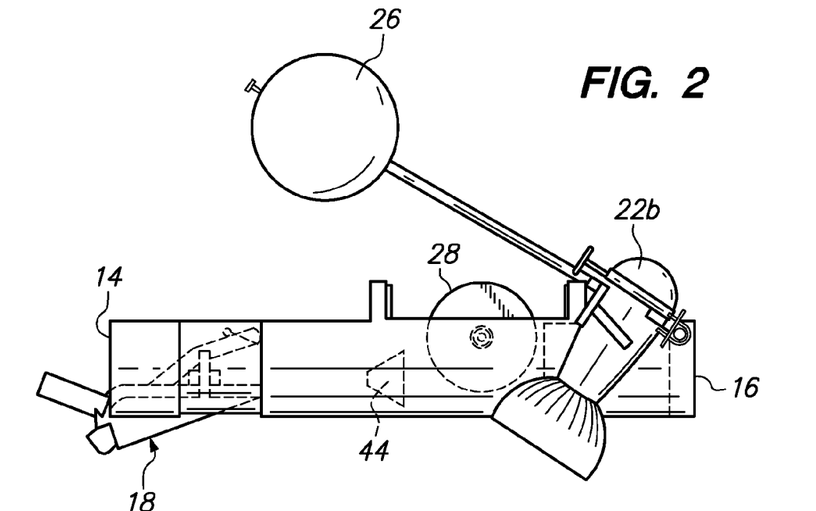
FIG. 2 is a side view of the plow of FIG. 1 while in a stowed state.
Figure 3:
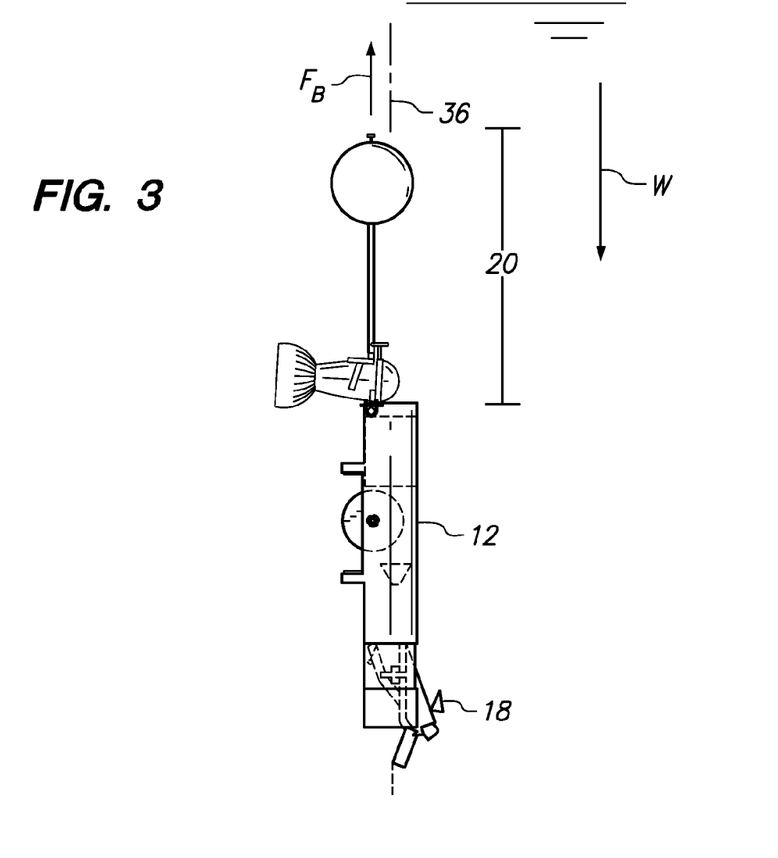
FIG. 3 is a side view of the plow of FIG. 1 after the plow has been initially deployed, while it is sinking toward the ocean floor.

The plow 10 takes up less space when it is in a stowed condition with the propulsion assembly 20 folded over the frame, as shown in FIG. 2. Once at the site where the payload 30 is to be deployed, the plow can be deposited into the water. Despite the presence of float 26, the plow 10 is made of materials that make the plow 10 negatively buoyant in sea water. Stated differently, the plow 10 is formed with materials that result in the overall weight W of the plow 10 being greater than the buoyancy force $F_B$ that is established in float 26. With this configuration, when the plow is released from the deployment vessel, it begins to sink. As the plow sinks toward the sea floor, the float 26 causes the thruster support bar 24 to pivot away from frame 12, from the stowed position to a transit position. While the plow 10 is in transit to the ocean floor, propulsion assembly 20 is aligned with a longitudinal axis 36 defined by frame 12, as shown in FIG. 3.

Figure 4:
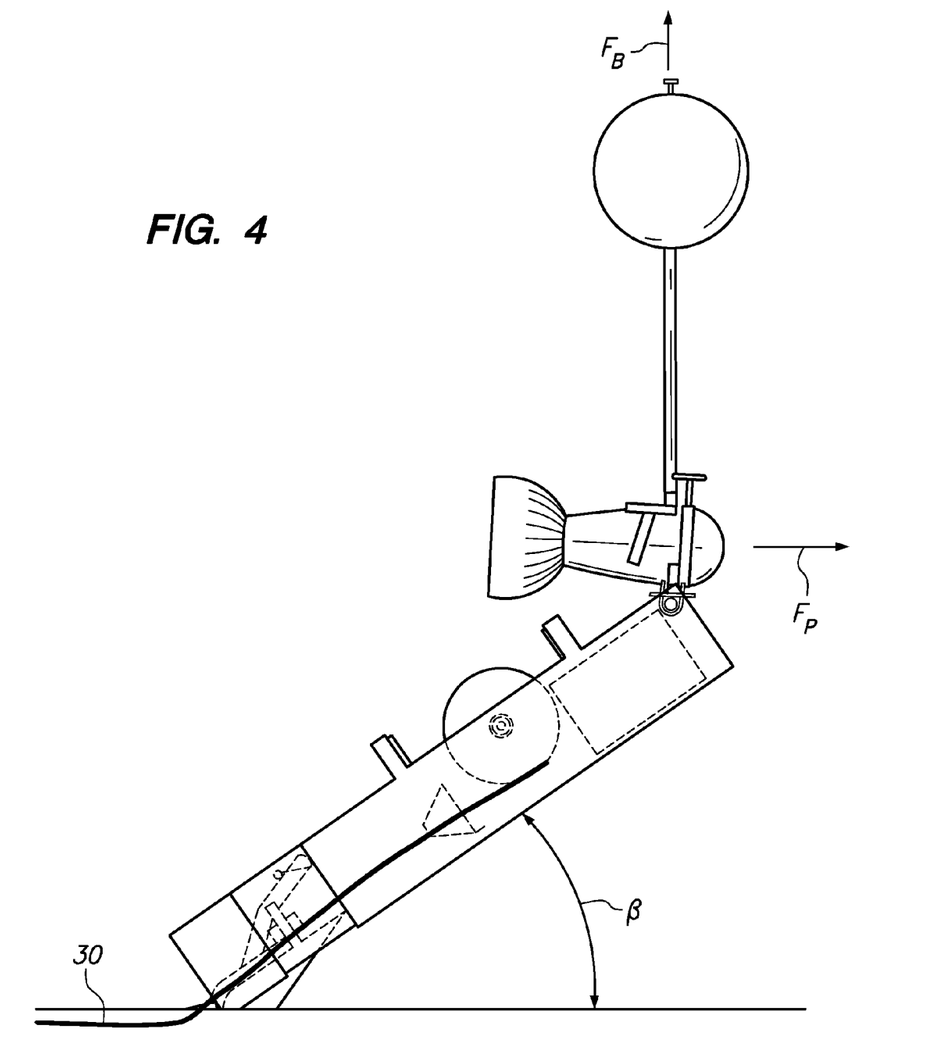
FIG. 4 is a side view of the plow of FIG. 1 with the plow fully deployed on the ocean floor.
Figure 5:
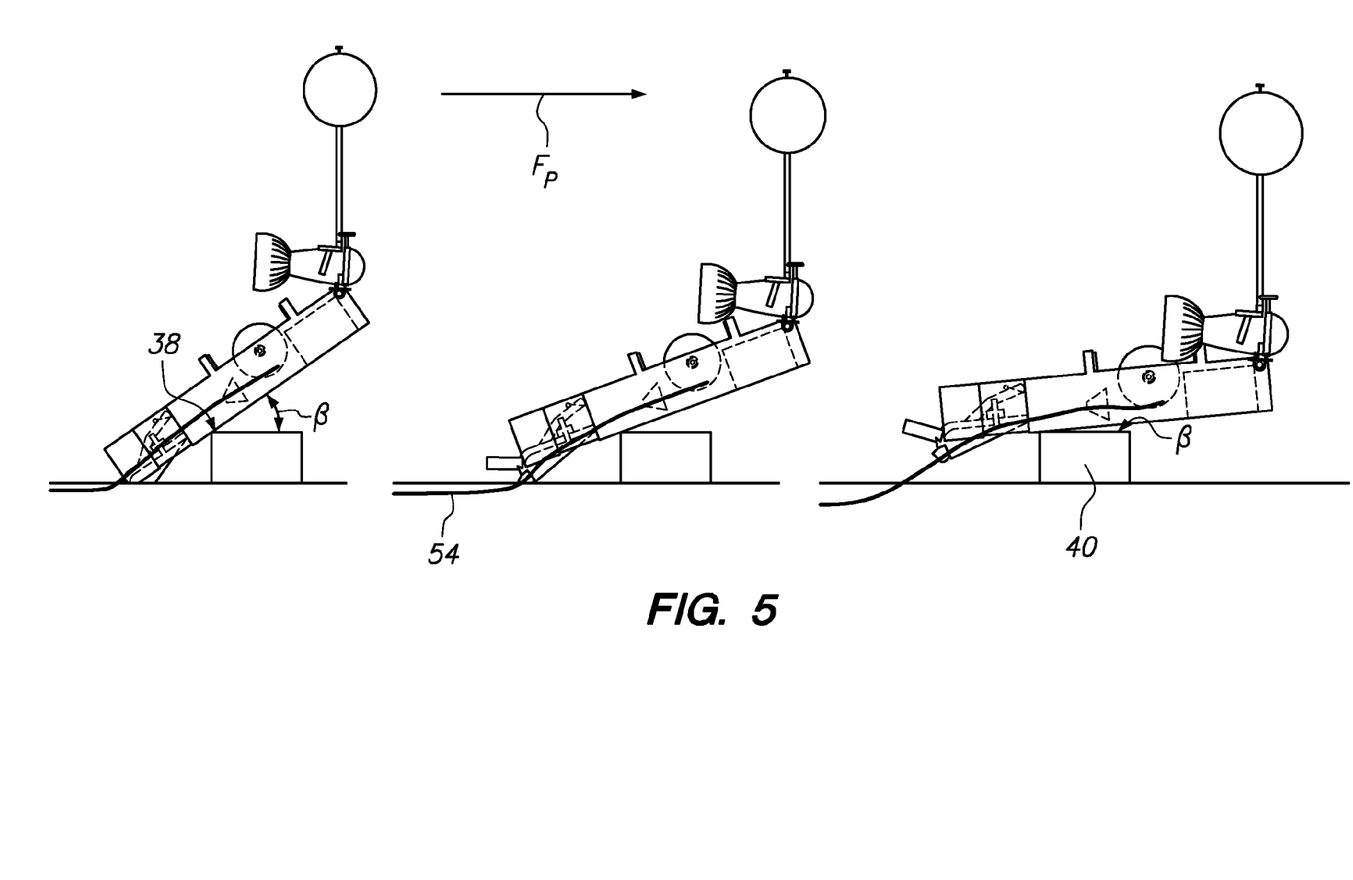
FIG. 5 is the same view of FIG. 4, which illustrates how the plow overcomes an obstacle on the ocean floor.
Figure 6:
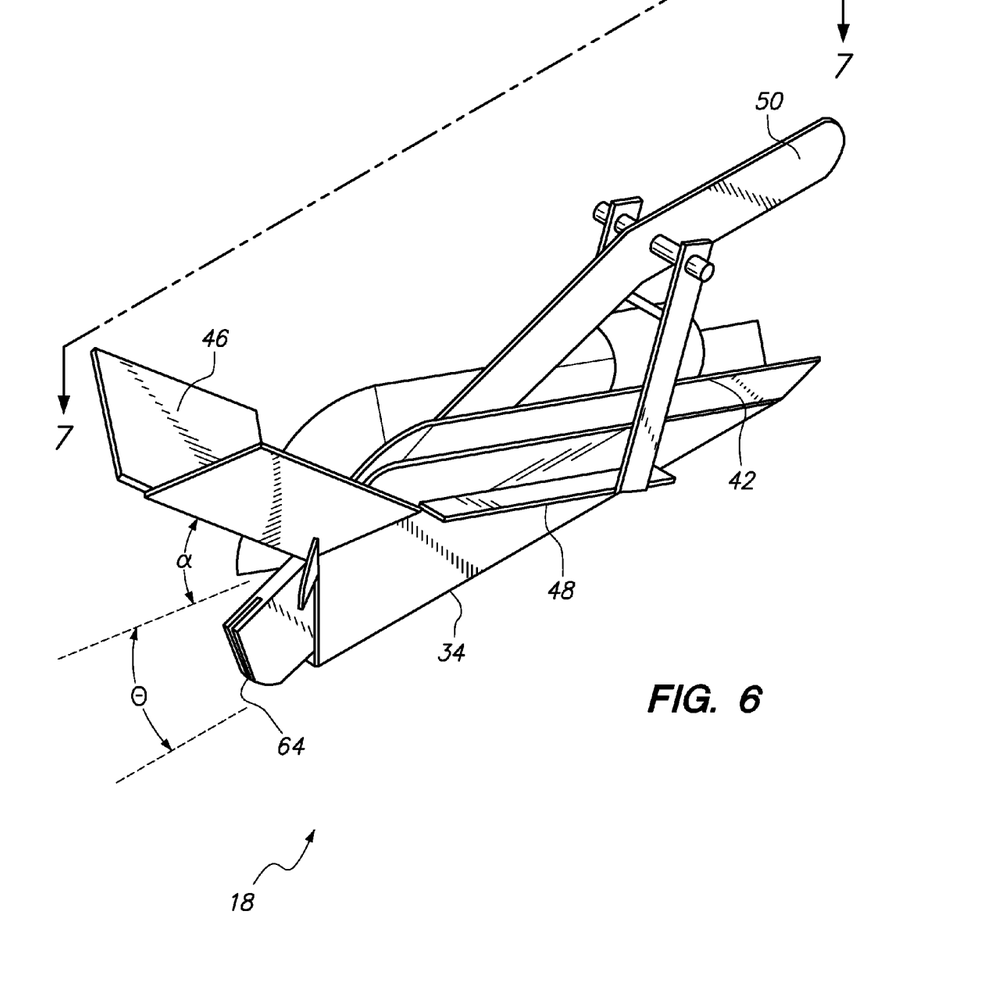
FIG. 6 is a side elevational view of the plow assembly of the plow of FIG. 5.

The plow 10 assumes a posture similar to that shown in FIGS. 4-6 during normal deployment. Once the plow assembly 18 contacts the sea floor, blade 34 of plow assembly 18 digs into the ocean floor. The float 26 provides a buoyancy force $F_B$ that is less than the weight of the plow; however, $F_B$ is sufficient to raise the float end 16 of frame 12 in a manner that establishes a rake angle β between the ocean floor and longitudinal axis 36 of frame 12, as shown in FIG. 4. The arrival of the plow on the sea floor is recognized by a computer control module (CCM) 32 that is fixed to frame 12, either by a contact switch or by other means that are known in the prior art. CCM 32 is in communication with thrusters 22a and 22b, and CCM 32 can send an activation signal to thrusters 22. Once the thrusters 22 are activated, CCM 32 maneuvers the plow 10 according to a preprogrammed heading. To do this, the CCM 32 can include an internal gyrocompass or similar type of structure incorporated therein.

If the plow encounters an obstacle during deployment, and referring primarily now to FIG. 5, the frame 12 pivots about a pivot point 38 on frame 12 where frame 12 contacts obstacle 40. As frame pivots about pivot point 38, float end 16 becomes temporarily lowered and rake angle β is temporarily decreased. This motion decreases the rake angle β of the plow assembly 18, thereby increasing the chance of clearing the obstacle. At the same time, $F_P$ remains constant in the horizontal plane. The decrease in rake angle β allow for more $F_P$ to take effect so that the invention can be more effectively dragged over the obstacle 40 solely by the horizontal propulsive force in thrusters 22, instead of having to be lifted over the obstacle by a remote support ship or the like. The underside of frame 12 can further be fabricated so that it is smooth, without any notches, seams and the like, which could catch on obstacle 40 and cause the plow to become snagged during operation.

While the float end is lowering and the frame 12 is pivoting about pivot point 38 as the plow 10 overcomes obstacle 40, the thrust $F_P$ from the thrusters 22 remains horizontal. This is because of rigid coupling between float 26 and thrusters 22 with support bar 24, and because propulsion assembly 20 pivots on frame 12, as frame 12 pivots on pivot point 38 of obstacle 40. Once the plow 10 has cleared the obstacle, the float raises propulsion 26 and plow blade 34 digs back into the ocean floor to re-establish the rake angle β depicted in FIG. 4.

Figure 1:
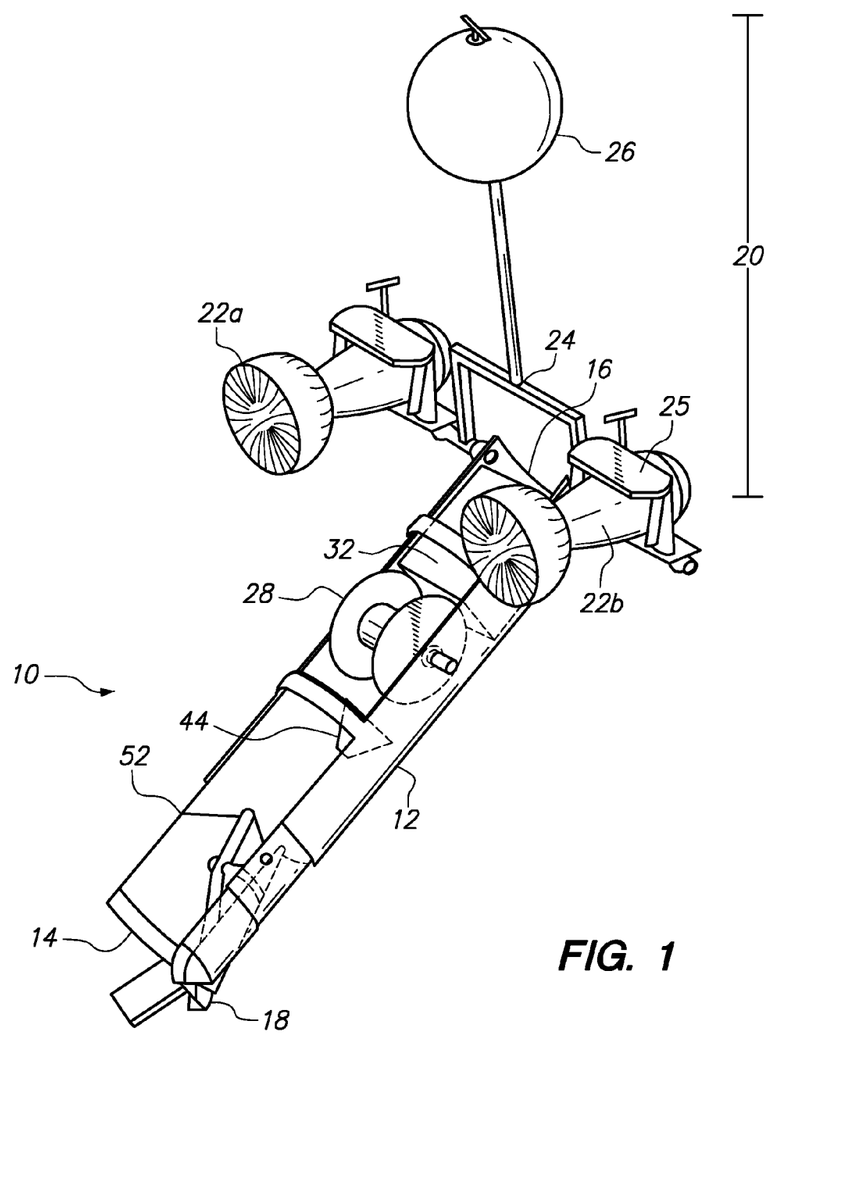
FIG. 1 is an elevational view of an underwater plow according to several embodiments of the present invention.
Figure 7:
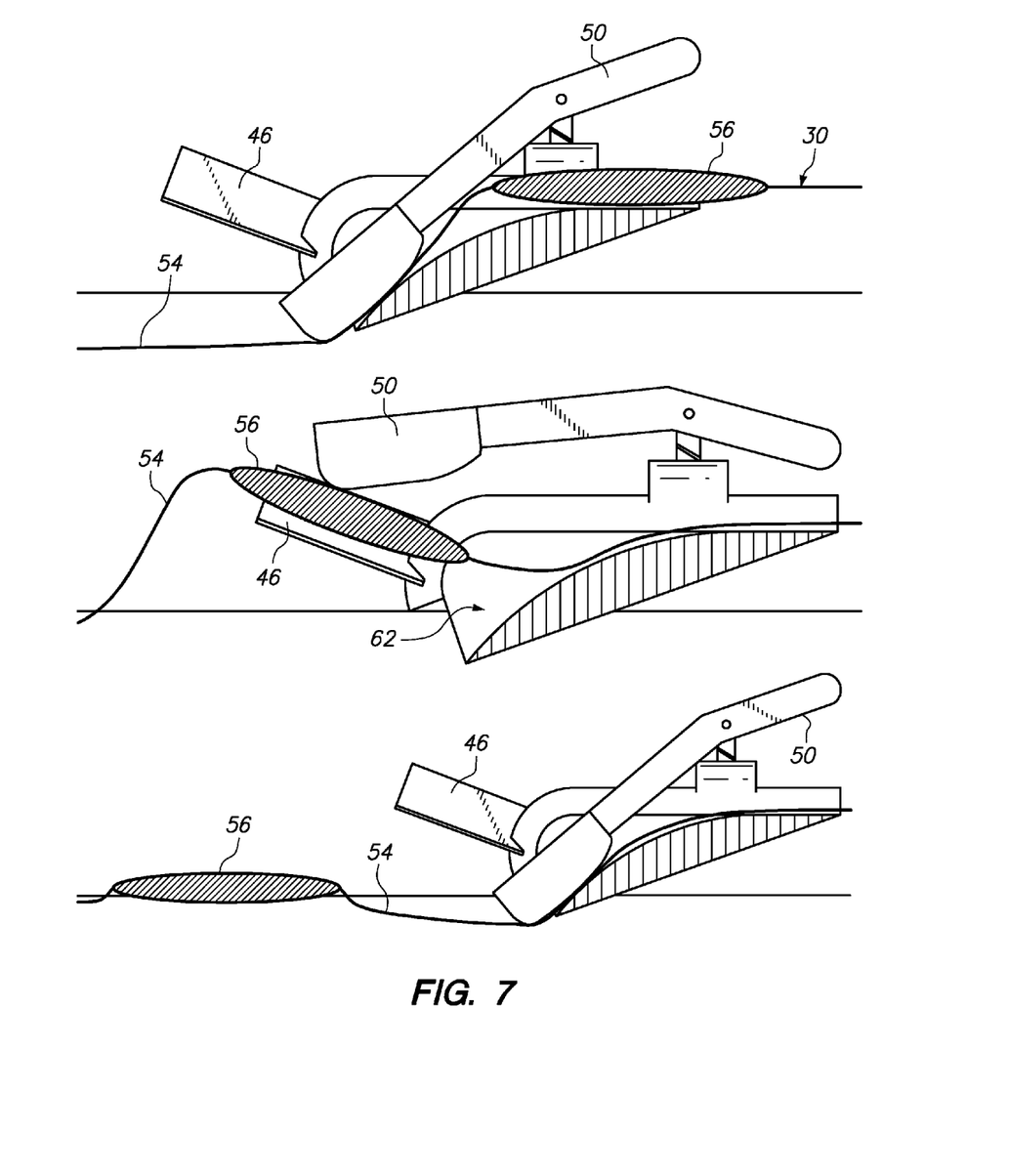
FIG. 7 is a cross-sectional view of the plow assembly of FIG. 6 taken along line 7-7 in FIG. 6, which shows the manner in which the payload is passes through the plow assembly during deployment.

Referring now to FIGS. 6-7, the plow assembly is shown in greater detail. As shown, plow assembly 18 can include horizontal edges 48, which lies in a plan that is coincident with longitudinal axis 36 when plow assembly 18 is fixed to frame 12. Horizontal edges 48 merge into a blade portion 34 that extends below the plane coincident with horizontal edges 48 by an angle θ, and a cable path 42 that is fixed to blade 34. A fairlead 44 can be fixed to the proximal end of plow assembly 18 next to path 42 (fairlead 44 is shown in FIGS. 1-2) to thread cable-and-sensor payload 30 into plow assembly 18. A sensor chute 46 can be attached to the blade 34 so that it extends upwardly from horizontal edges 48 by an angle α with the plane coincident with the aforementioned horizontal edges 48 of blade 34. A depressor arm 50 can be pivotably attached to blade 34 at horizontal edges 48. Blade 34 can define a trough 62, and depressor arm 50 can be biased with a torsion spring (not shown), or other resilient member 52 (See FIG. 1) so that depressor arm 50 rests in the blade trough 62 in contact with blade 34. Depressor arm 50 is formed with a groove 64 at its distal end, as shown in FIG. 6.

During operation of the plow 10, payload 30 is stored on the spool 28, which is fixed to frame 12 in a storage space defined by semi-cylindrical frame 12. Spool 28 has only a small amount of back tension so that payload cable 54 deploys into the trench created by the plow blade 34 as the plow is propelled forward. The payload cable 54 and payload elements 56 are aligned with the plow assembly 18 prior to entering the plow mechanism by the funnel shaped fairlead 44, which is shown in FIG. 1. This ensures the smooth flow of payload cable 54 into the plow assembly 18.

As shown in FIG. 7, the blade 34 digs into the ocean floor 66 and temporarily establishes a trench in the floor as the plow operates. As payload 30 is threaded into plow assembly 18, cable 54 of payload 30 is threaded into the blade trough and exits the blade through groove 64 while blade 34 is in contact with the trough, where causes cable 54 to become buried as the trench dug by blade 34 fills back in. When a sensor element 56 is encountered, however, the element is too wide to pass through groove 64.

Instead of passing through the groove 64 and being buried in the trench established by blade 34, the sensor element 56 is urged upward from the horizontal plane into the sensor chute 46. As the element 56 is urged upward, it forces the plow depressor arm 50 to pivot outwardly and away from the blade trough 62. The depressor arm 50 pivots and allows the sensor element 56 to slide past depressor arm 50 and become directed upward towards sensor chute 46, where the sensor is deposited on the ocean floor after exiting chute 46. When the sensor has passed through the plow assembly, the pivot arm is compelled by spring tension back to its biased position in contact with trough 62, to direct the cable 54 back into the bottom of the plow trough, where it becomes buried when the trench fills back in after the blade 34 passes through the ocean floor. With this configuration, the cable 54 of payload 30 becomes buried during operation of the undersea plow according to several embodiments.

Figure 10:
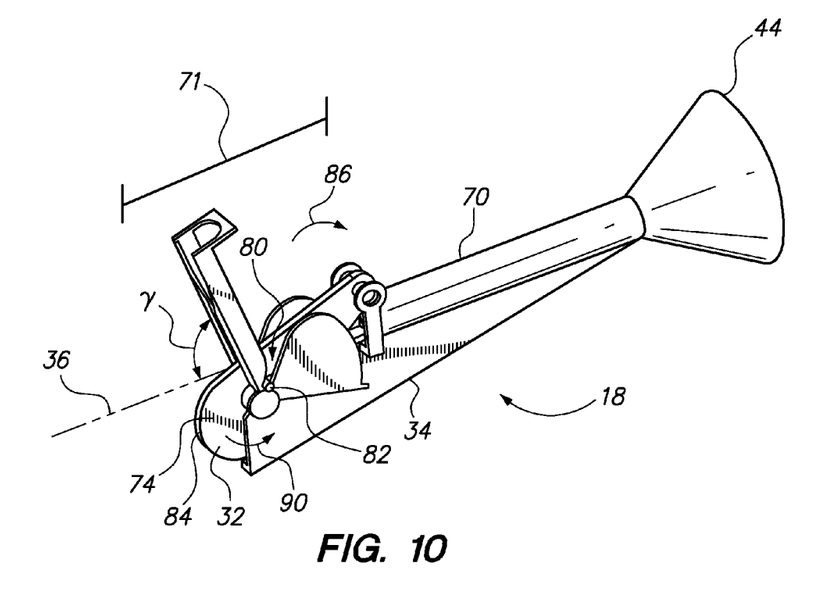
FIG. 10 is a side elevational view of an alternative embodiment of the plow assembly of FIG. 6.
Figure 11:
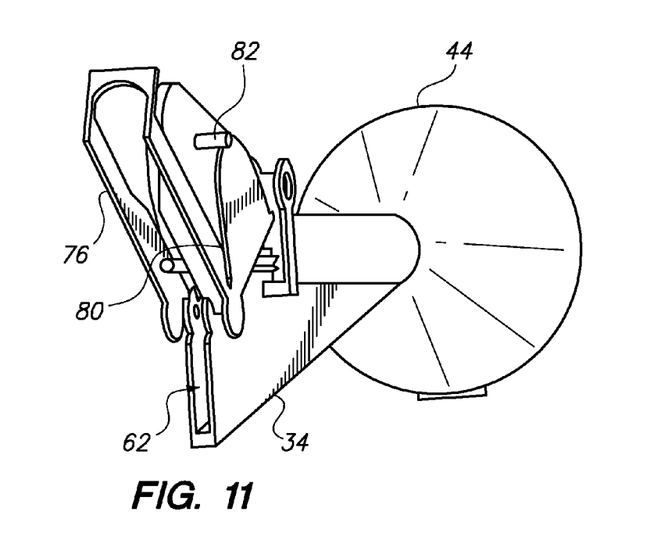
FIG. 11 is a front elevational view of the plow assembly of FIG. 10.
Figure 12:
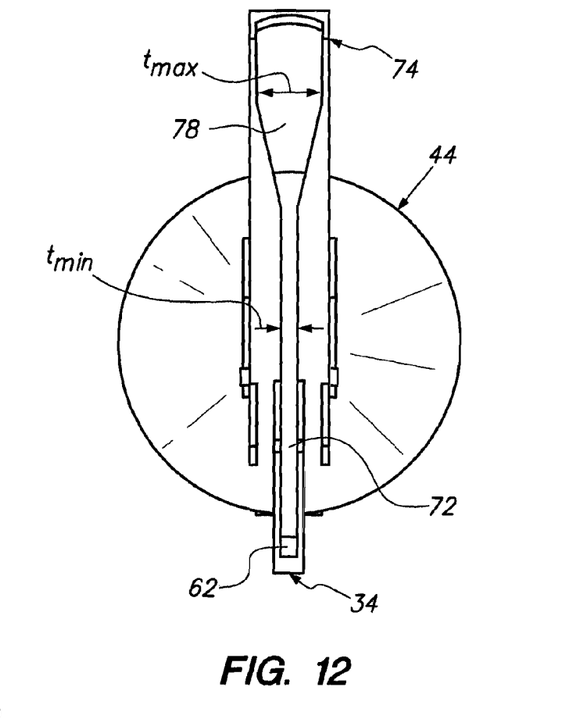
FIG. 12 is a front plan view of the plow assembly of FIG. 10.
Figure 13:
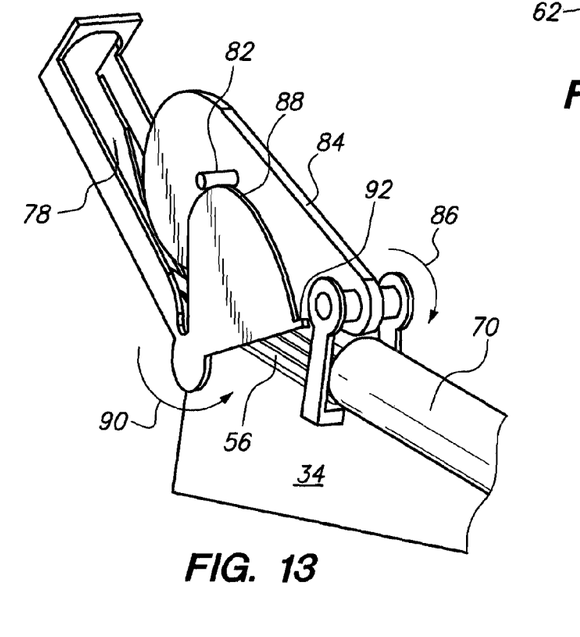
FIG. 13 is a rear elevational view of the plow assembly of FIG. 10.

Referring primarily now to FIGS. 10-13, an alternative embodiment for plow assembly 18 is shown. As shown, plow assembly can include a blade 34 that merges into body 70. A fairlead 44 is attached to the proximal end of body 70. The blade is formed with trough 62, as best seen in FIG. 11. The trough 62 is sized to allow cable 54, but not sensor element 56, to pass through trough 62. A cam assembly 71, which can include a depressor cam 72 and a chute cam 74, can be fixed to blade portion 34. Depressor cam 72 is pivotably attached to blade 34 at a point around the middle of the blade 34, and a chute cam 74 is also pivotably at the distal end of blade 34. The depressor cam 72 has a thickness that corresponds to the width of the trough, so that depressor cam 72 is partially located within trough 62 while in its biased position. A torsional spring or similar type of device can be used to bias depressor cam 72 in contact with blade 34 within the trough 62.

This chute cam 74 has an arm 76 that is formed with a slot 78. As shown in FIG. 11, slot 78 has a minimum thickness $t_{min}$ proximate the attachment point chute cam, with the slot thickness having an increasing taper to a maximum thickness $t_{max}$ at the distal end of arm 76, as perhaps best seen in FIG. 12. The chute cam 74 can biased with a resilient member so that it establishes an angle γ with longitudinal axis 36, as shown in FIG. 10. Chute cam 74 is formed with a notch 80, and pin 82 of depressor cam rests in notch 80 while the cam assembly is in its biased position, as shown in FIG. 10.

For this embodiment, as the blade 34 digs into the ocean floor 66 and temporarily establishes a trench in the floor during operation, payload 30 is threaded into plow assembly 18 through fairlead 44 and body 70. Cable 54 of payload 30 is guided into the blade trough. The edge 84 of depressor cam 72 contacts cable 54, and the biasing action of depressor cam 72 positions cable 54 at the bottom of trough 62 until cable 54 blade 34. As cable 54 exits blade 34, it becomes buried as the trench that had been dug by blade 34 fills back in.

When a sensor element 56 is encountered, however, the element is too wide to enter into blade trough 62. Instead of passing into trough 62, sensor element 56 exits body 70 and rides along the depressor cam edge 84 and the top of blade 34. As sensor element 56 continues to pass through the plow assembly, this can cause depressor cam 72 to pivot in the direction indicated by arrow 86 in FIGS. 10 and 13. As depressor cam 72 pivots, pin 82 moves out of notch 80 and rides along chute cam edge 88. The movement can allow the chute cam 74 to move in a contra-rotating motion relative to depressor cam 72, in the direction indicated by arrow 90.

Chute cam 74 continues to contra-rotate relative to depressor cam 72. During this contra-rotation, pin 82 travels along chute cam edge 88 until the pin 82 of depressor cam 72 reaches stop 92 of chute cam 74. Once this occurs, the arm 76 of chute cam 74 is roughly coincident with longitudinal axis 36. Sensor element continues to move along arm 76 until it reaches a portion of slot 78 with slot thickness $t_{max}$ that is sufficient to allow it to drop through arm 76 and become buried in ocean floor 66. Once this occurs, chute cam 74 and depressor cam 72 pop back to their original positions, wherein depressor cam 72 is within trough 62, wherein depressor cam edge 84 contacts cable 54 and wherein pin 82 is located substantially within notch 80 of chute cam 74. When the sensor has passed through the plow assembly, the pivot arm is compelled by spring tension back to its biased position in contact with trough 62, to direct the cable 54 back into the bottom of the plow trough, where it becomes buried when the trench fills back in after the blade 34 passes through the ocean floor. With this configuration, the cable 54 of payload 30 becomes buried during operation of the undersea plow according to several embodiments.

Figure 8:
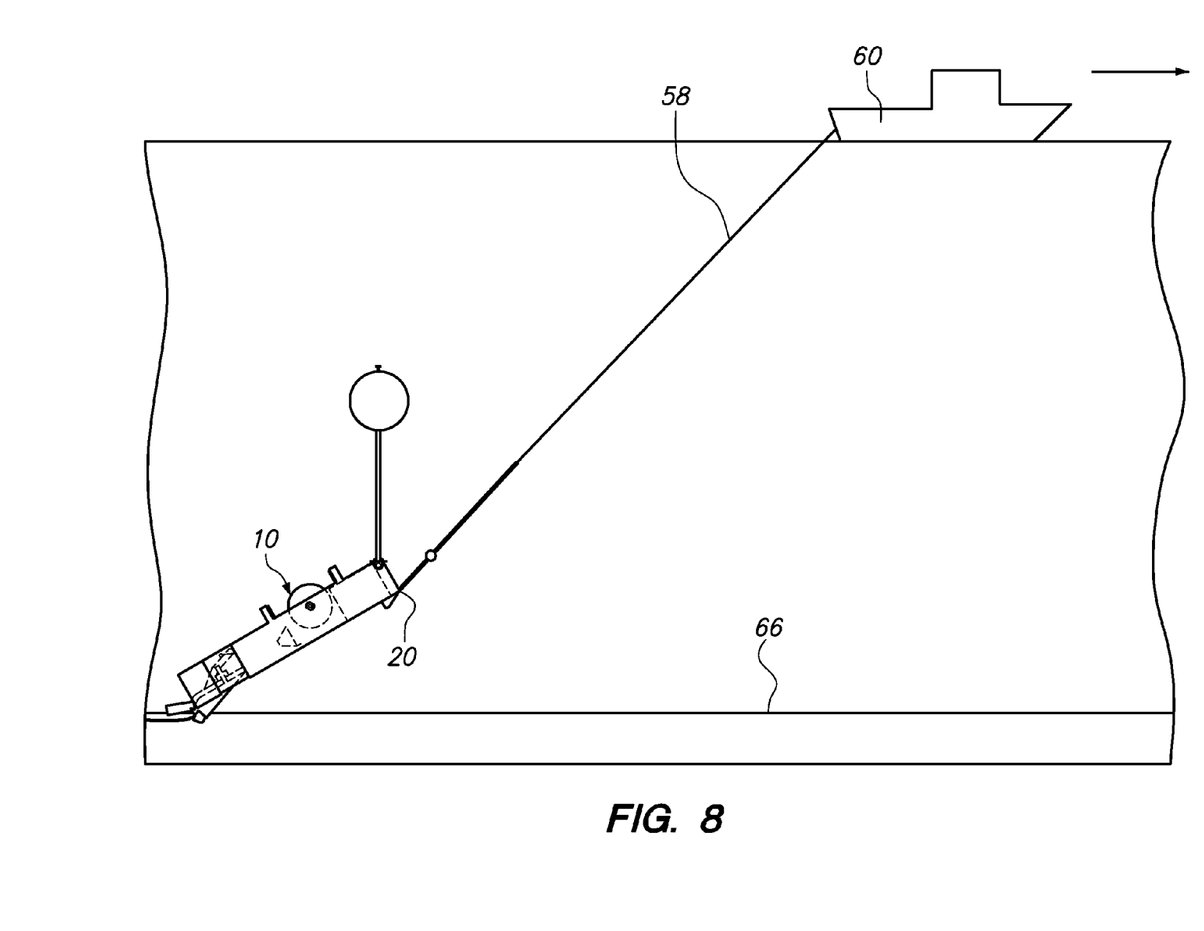
FIG. 8 is a diagram that illustrates how a plow according to several alternative embodiments could be propelled by being towed by a vessel.

Referring now to FIG. 8, an alternative embodiment of the invention is shown. As shown, for some heavy duty applications that include a large payload, or a heavy duty frame 12 that can withstand environmental conditions, it may be desirable to provide additional power to propel the plow 10. For these conditions, the plow 10 can be connected to a surface vessel 60 via towing cable 58 to move the plow in the direction desired by the user. The vessel can either supplement the aforementioned thrusters 22, or it can be used in lieu of the thrusters 22 to provide propulsion force $F_P$ to move the plow 10.

Figure 9:
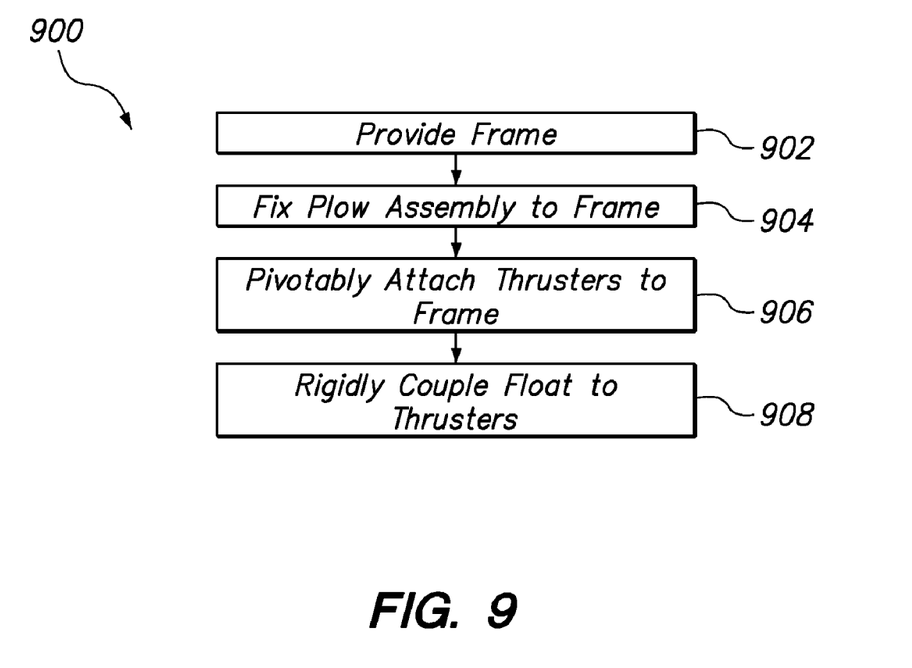
FIG. 9 is a block diagram that is illustrative of steps that can be taken to practice the methods according to several embodiments of the invention.

Referring now to FIG. 9, a block diagram is shown that is illustrative of steps that can be taken to practice the methods of the invention according to several embodiments. As shown in FIG. 9, the steps taken can include the step of providing a plow frame, as illustrated by step 902. The plow frame can have a plow and a float end, and the methods can further include the step of fixing a plow assembly to the plow end, as shown by block 904 in FIG. 9. To propel the underwater plow, a propulsion means (such as thrusters 22, for example) can be pivotably attached to the float end of frame 12, as shown by block 906 in FIG. 9. Additionally, the methods can include the step of rigidly coupling a float to the propulsion means, as shown by step 908 in FIG. 9. The rigid coupling of the float and propulsion means, combined with the pivoted coupling of the propulsion means and frame, allows for operation of the plow 10 as described above. The methods can further include the step of controlling the propulsion assembly to steer the plow 10 on a predetermined course. This can be accomplished by placing an internal gyrocompass in the computer control module 32 that is attached to frame 12 as described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of any ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An underwater plow for burying a sensor array in an ocean floor, said sensor array including a cable and a plurality of sensors attached to said cable, said underwater plow comprising:
    a plow assembly;
    said plow assembly including a body and a blade portion defining a trough, said trough being sized to allow said cable to pass through said trough but not said plurality of sensors;
    a depressor cam pivotably attached to said body and biased within said trough;
    a chute cam pivotably attached to said blade portion so that said chute cam and said depressor cam contra-rotate as said sensor array passes through said plow assembly; and,
    said chute cam being formed with a stop, and said depressor cam being formed with a pin, said pin being in contact with said stop when said plurality of sensors is passing through said chute cam.

2. The plow of claim 1 wherein said chute cam is biased at an angle γ from a longitudinal axis defined by said plow assembly.

3. The plow of claim 1 wherein:
    said chute cam has a proximate end and a distal end;
    said chute cam is attached to said blade portion at said proximate end; and,
    said chute cam is formed with a slot having a minimum thickness $t_{min}$ at said proximate end that is sufficient to allow said cable to pass therethrough, but not said plurality of sensors, said slot having an increasing taper to a maximum thickness $t_{max}$ at said chute cam distal end to allow said plurality of sensors to pass through said chute cam.

4. The plow of claim 1 further comprising a fairlead attached to said body.

5. The plow of claim 4 wherein said plow assembly has a proximal end and a distal end, and further comprising:
    a semi-cylindrical frame having a plow end and a float end; and,
    wherein said proximal end of said plow assembly is attached to said semi-cylindrical frame plow end so that said semi-cylindrical frame at least partially surrounds said fairlead.

6. The plow of claim 1 wherein said plow has an overall weight W, and further comprising:
    a float pivotably attached to said semi-cylindrical frame float end; and,
    wherein said float establishes a buoyancy force $F_B$ that is less than said weight W, but that is sufficient to lift said float end when said plow assembly contacts the ocean floor to establish a rake angle β between said semi-cylindrical frame and the ocean floor.

7. An underwater plow for burying a sensor array in an ocean floor, said sensor array including a cable and a plurality of sensors attached to said cable, said plow having a plow assembly comprising:
    a blade portion;
    a depressor cam pivotably attached to said blade portion and biased to rotate in a first direction when said sensor array passes through said plow assembly;
    a chute cam having a proximate end and a distal end, said chute cam being pivotably attached to said blade portion so that said chute cam contra-rotates in a second direction that is opposite from said first direction when said sensor array passes through said plow assembly;
    said chute cam being formed with a slot having a minimum thickness $t_{min}$ at said proximate end that is sufficient to allow said cable to pass therethrough, but not said plurality of sensors, said slot having an increasing taper to a maximum thickness $t_{max}$ at said chute cam distal end that is sufficient to allow said plurality of sensors to pass through said chute cam; and,
    said chute cam being formed with a stop, and said depressor cam being formed with a pin, said pin being in contact with said stop when said plurality of sensors is passing through said chute cam.

8. The plow of claim 7 wherein said blade portion is formed with a trough and said depressor cam is biased within said trough.

9. The plow of claim 7 wherein said chute cam is biased at an angle γ from a longitudinal axis defined by said plow assembly.

10. The plow of claim 7 further comprising a fairlead attached to said plow assembly.

11. The plow of claim 10 wherein said plow assembly has a proximal end and a distal end, and further comprising:

a semi-cylindrical frame having a plow end and a float end; and, wherein said plow assembly proximal end is attached to said semi-cylindrical frame plow end so that said semi-cylindrical frame is disposed around said fairlead.

12. The plow of claim 11 wherein said plow has an overall weight W, and further comprising:

a float pivotably attached to said float end of said semi-cylindrical frame; and, wherein said float establishes a buoyancy force $F_B$ that is less than said weight W, but that is sufficient to lift said float end when said plow assembly contacts said ocean floor to establish a rake angle $\beta$ between said semi-cylindrical frame and said ocean floor.

13. A method for using an underwater plow to deploy a sensor array in an ocean floor, said sensor array including a cable and a plurality of sensors attached to said cable, said method comprising the steps of:

A) providing a semi-cylindrical frame, said semi-cylindrical frame defining a longitudinal axis, and being formed with a storage space for receiving said sensor array;

B) attaching a plow assembly to said frame, said plow assembly including a blade portion that defines a trough that allows said cable to pass through said plow assembly, but that does not allow said plurality of sensors to pass through said plow assembly;

C) pivotably fixing a depressor cam to said plow assembly so that said depressor cam is biased in contact with said trough; and, D) pivotably attaching a chute cam to said plow assembly so that said chute cam contra-rotates with said depressor cam said chute cam being formed with a pin, said depressor cam being formed with a stop, said step D) being accomplished in a manner that causes said pin to contact said stop when said sensor passes through said chute cam.

\* \* \* \* \*